(12) United States Patent
Knapp

(10) Patent No.: US 7,711,616 B2
(45) Date of Patent: May 4, 2010

(54) ANONYMOUS TRANSACTIONS BETWEEN AN ENTITY AND A PROVIDER

(75) Inventor: Verna E. Knapp, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2516 days.

(21) Appl. No.: 10/121,563

(22) Filed: Apr. 12, 2002

(65) Prior Publication Data
US 2003/0046202 A1 Mar. 6, 2003

Related U.S. Application Data

(63) Continuation-in-part of application No. 09/944,739, filed on Aug. 31, 2001.

(51) Int. Cl.
*G06Q 40/00* (2006.01)
(52) U.S. Cl. .......................... 705/35; 705/74
(58) Field of Classification Search .............. 705/1, 705/26, 35, 39, 40, 41, 38
See application file for complete search history.

(56) References Cited

U.S. PATENT DOCUMENTS 5,839,119 A * 11/1998 Krsul et al. ................. 705/39
2002/0022967 A1 * 2/2002 Ohkado ....................... 705/1

OTHER PUBLICATIONS

GeoTrust Cuts Risk for Companies Doing Big Business Online (GeoTrust Partners With ProVillage To Set the Standard for Trusted Internet Transactions. Business Wire , p. 0050. Aug. 23, 2000).*

* cited by examiner

*Primary Examiner*—Ojo O Oyebisi

(57) ABSTRACT

An entity initiates a transaction with a provider by sending an entity identification to a first anonymity service. In response, the entity receives a transaction identification, based on and uniquely associated with the entity identification, from the first anonymity service. Thereafter, the entity initiates acquisition of goods associated with the transaction by sending an acquisition request and the transaction identification to a second anonymity service. In this manner, enhanced security and privacy is achieved.

37 Claims, 10 Drawing Sheets

ANONYMOUS TRANSACTIONS BETWEEN AN ENTITY AND A PROVIDER

CROSS-REFERENCE TO RELATED APPLICATION

The instant application is a continuation-in-part of prior U.S. patent application Ser. No. 09/944,739, entitled ANONYMOUS ACQUISITION OF DIGITAL PRODUCTS BASED ON SECRET SPLITTING, filed Aug. 31, 2001 by Vora et al.

BACKGROUND OF THE INVENTION

Electronic commerce is increasingly becoming a part of everyday life. In particular, the rapid growth of the Internet and World Wide Web has lead to a corresponding increase in the ability to acquire goods and services remotely.

The desire for privacy has lead to an increase in a number of services that maintain in secret the identity of users of those services. For example, a variety of anonymous e-mail services are currently available whereby recipients of an e-mail are not able to associate the sending entity's identification with the e-mail. While such services help maintain privacy, they also provide a means by which malicious parties may act more freely. Furthermore, in a purchase transaction, such anonymity could be used to perpetuate fraud against vendors. Therefore, a need exists for technique that provides enhanced privacy during e-commerce transactions, but that also provides a degree of accountability such that the opportunity for malicious acts is minimized.

SUMMARY OF THE INVENTION

The present invention provides a technique whereby an entity can anonymously engage in a transaction with a provider. In one embodiment of the present invention, the entity initiates the transaction by sending an entity identification to a first anonymity service. In response, the entity receives a transaction identification, based on and uniquely associated with the entity identification, from the first anonymity service. Thereafter, the entity initiates acquisition of goods associated with the transaction by sending an acquisition request and the transaction identification to a second anonymity service.

DETAILED DESCRIPTION OF THE PREFERRED EMBODIMENT

Figure 1:
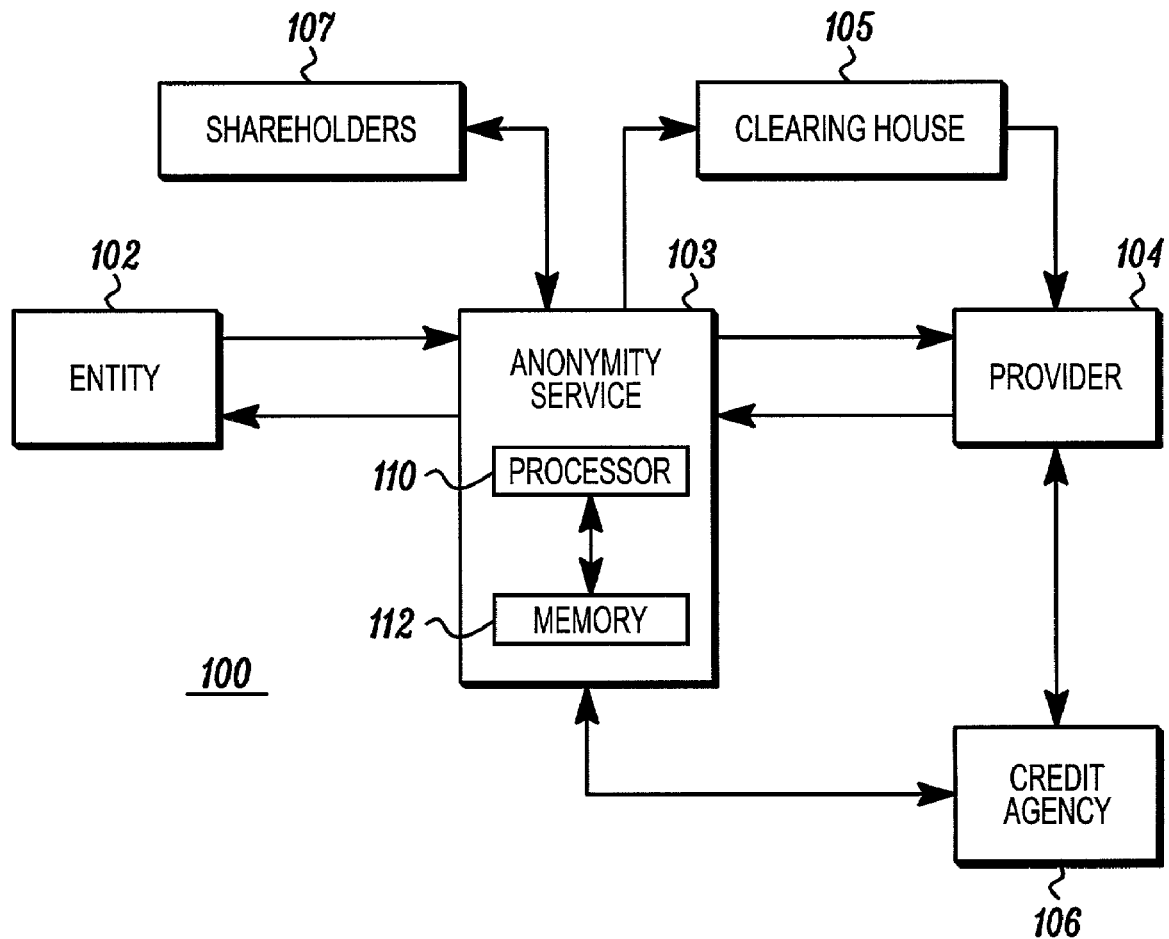
FIG. 1 is a block diagram illustrating an arrangement that may be used for electronic commerce in accordance with an embodiment of the present invention.

The present invention may be more readily described with reference to FIGS. 1-12. Referring now to FIG. 1, there is illustrated a block diagram of a system 100 in accordance with the present invention. In particular, an anonymity service 103 is provided as an intermediary between the entity 102 and provider 104. Additionally, the anonymity service is in communication with a plurality of shareholders 107, a clearing house 105 and a credit agency 106. Although direct connections are illustrated between the anonymity service 103 and the various other elements of the system 100, it is understood that these connections may comprise paths established through public networks such as the Internet or World Wide Web, within private networks or through a combination of public and private networks.

In the context of the present invention, each of a plurality of entities 102 (one shown) may comprise any individual or organization capable of acquiring a digital product from the provider 104. In practice, each entity 102 communicates with the anonymity service 103 via a computer implementing a network communication program, such as a browser or the like. The provider 104, in turn, may likewise comprise any individual or organization that provides digital products via a communication network. In the context of the present invention, digital products comprise anything capable of delivery via a communication network. For example, digital products may include downloadable software or digital data such as text, audio, video or images. Those having ordinary skill in the art will recognize that other types of digital products may be used in conjunction with the present invention, and the present invention is not limited in this regard.

The anonymity service 103 preferably comprises a computer-implemented service available via a communication network such as the Internet or World Wide Web. As depicted in FIG. 1, the anonymity service 103 preferably comprises a processor 110 and memory 112. For example, the anonymity service may be implemented using one or more network servers executing stored software routines as known in the art. A more detailed description of operation of the anonymity service 103 is provided below with reference to FIGS. 2-6.

The anonymity service 103 is in communication with a plurality of shareholders 107 and a clearing house 105. As described in greater detail below, each of the shareholders 107 is provided with a secret share which, by itself, does not enable an individual shareholder to reconstruct a secret. Preferably, for each secret involved in a given transaction, there exists a separate set of shareholders used to maintain secret shares about that secret. The number of shareholders in each set of shareholders can be equal, although this is not a requirement. As a matter of design choice, each set of shareholders may be completely independent from all other sets of shareholders, or they may share any number of common members to the point where they are identical. In any event, each shareholder is capable of receiving secret shares from the anonymity service 103. To this end, each shareholder preferably comprises a computer-implemented device capable of communicating with the anonymity service 103. Because secret sharing schemes are vulnerable to the extent that separate shareholders could collaborate to ascertain the secret in their possession, it is advantageous to maintain the identity of each shareholder in confidence from the other shareholders. Furthermore, it is preferred to select the shareholders such that they have an inherent reason not to collaborate with each other. For example, shareholders in possession of the secret shares corresponding to a single secret may comprise competitors in a given industry. Such competitors are inherently unlikely or unwilling to share information with each other. Additionally, the shareholders may comprise a privacy organization that is dedicated to advocating privacy in electronic commerce, and therefore unlikely to collaborate with other shareholders. Further still, the entity 102 may comprise one of the shareholders, or the shareholders 107 may be known to the entity 102, such as family members or friends.

The clearing house 105 comprises a computer-implemented service used to credit an account of the provider 104 in those instances in which the transaction between the entity 102 and the provider 104 is a purchase of a digital product. The credit agency 106 comprises a computer-implemented credit verification service used when a digital product is being purchased by the entity 102. Together, the clearing house 105 and credit agency 106 allow the anonymity service 103 to anonymously fulfill a purchase request from the entity 102. This is described in greater detail below with reference to FIGS. 3-6.

Figure 2:
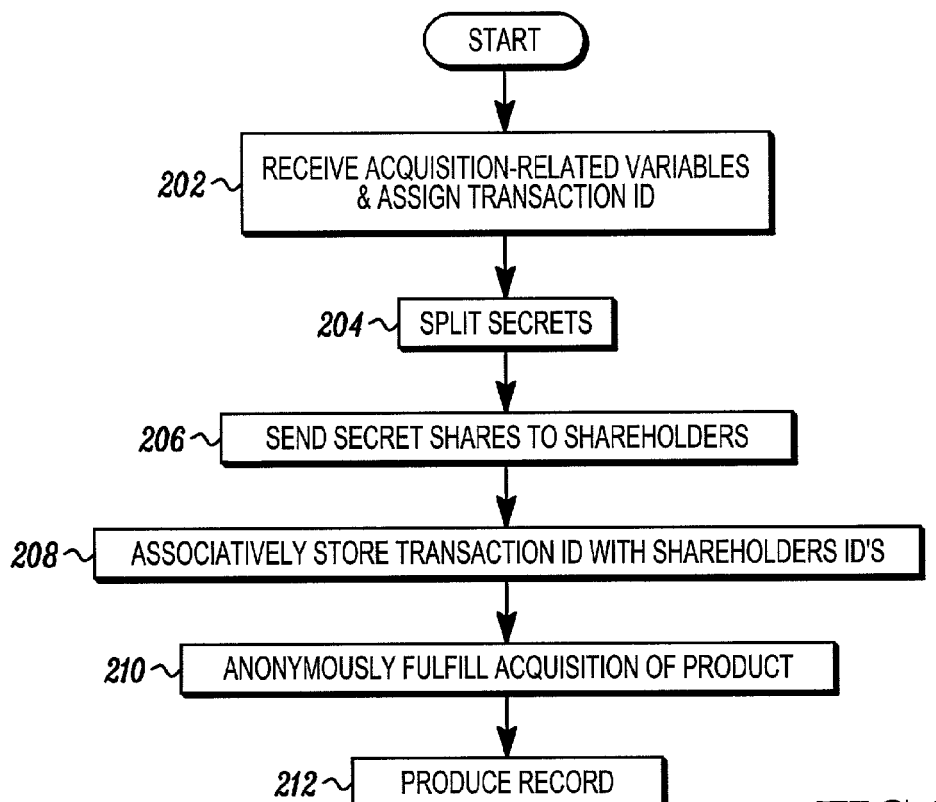
FIG. 2 is a flow chart illustrating an embodiment of a technique in accordance with the present invention.

Referring now to FIG. 2, a method in accordance with the present invention is illustrated. In particular, the method of FIG. 2 is preferably implemented by the anonymity service 103. Thus, at block 202 the anonymity service securely receives acquisition-related variables necessary for an entity to acquire a digital product. Security in the transmission of the acquisition-related variables may be provided using known techniques, such as encryption or a trusted path. In the context of the present invention, the acquisition-related variables comprise an entity identification, identifications of a provider of a digital product as well as the digital product itself, and in those instances in which the acquisition is a purchase, a purchase price. The entity identification may comprise any unique identifier such as a public key, credit card number or the like. Likewise, the identifications of the provider and product may comprise any identifiers uniquely associated with the provider and product, respectively. Those having ordinary skill in the art will appreciate that a greater or lesser number of acquisition-related variables may be used as determined by the type of acquisition being undertaken. The acquisition-related variables preferably comprise a component of an acquisition request sent by the entity to the anonymity service. The acquisition request may comprise a purchase request in those instances in which the digital product is offered for sale by the provider. Alternatively, the acquisition request may comprise a request for a free digital product such as shareware or a trial software package as are known in the art. Regardless, at block 202, the anonymity service additionally assigns a unique transaction identification to the acquisition request and associated acquisition-related variables. The anonymity service uses the transaction identification to track and fulfill the acquisition request.

At block 204, the anonymity service uses a cryptographic secret splitting technique to split each of the secrets, i.e., the acquisition-related variables, into a plurality of secret shares. Such secret splitting techniques are well known in the art. In essence, a secret splitting technique takes a secret and divides it up into pieces such that each piece by itself does not allow a holder of that piece to reconstruct the secret. However, a holder in possession of all of the pieces is able to reconstruct the secret.

As an example of secret sharing, assume that a party A wishes to split a secret S into three shares that will be subsequently given to parties B, C and D. In accordance with a preferred embodiment of the present invention, further assume that the secret S is represented as a string of bits having length M. First, A generates two random bit strings, X and Y, each of length M. (Techniques for generating random bit strings are well known in the art of cryptography and are therefore not described in detail herein.) The secret S is thereafter exclusive-OR'd with X and Y to provide a new bit string Z, also of length M:

$$Z = S \oplus X \oplus Y$$

Thereafter, A provides Z, X and Y (the secret shares) to, for example, B, C and D (the shareholders), respectively. Note that none of B, C or D is able to reconstruct the secret S based solely on their respective share (Z, X or Y). To the contrary, the only way to reconstruct the secret is to combine the secret shares once again:

$$S = Z \oplus X \oplus Y$$

While this is a simple example, it illustrates the basic concept and implementation of secret splitting. For example, a larger number of shareholders may be employed by simply generating additional random bit strings to combine with the secret. One publication teaching a variety of cryptographic secret splitting techniques is "Applied Cryptography" by Bruce Schneier (John Marley & Sons, 1996), the teachings of which are incorporated herein by this reference. Referring back to FIG. 2, the number of secret shares provided at block 204 for each secret is a matter of design choice. Furthermore, the number of secret shares for one secret does not necessarily have to be equal to the number of secret shares for another secret.

At block 206, the secret shares created at block 204 are sent to shareholders for long term storage. While the secret shares could be sent to the shareholders in encrypted form in order to enhance security, the secret shares are sent unencrypted in another embodiment. The length of time each shareholder will store a corresponding secret share is a matter of design choice and may be dictated, for example, by legal requirements setting the length of time documentation regarding a transaction is to be stored. Once these secrets have been split and sent to the respective shareholders, the anonymity service discards any copies of the secrets. In essence, the anonymity service consumes each secret and distributes the resulting secret shares to corresponding shareholders. So that each secret share can be later recalled by the anonymity service as needed, the anonymity service additionally provides the transaction identification assigned at block 202 to each respective shareholder. Optionally, the anonymity service may provide an identification of the anonymity service itself to each shareholder. Substantially simultaneous to the transmission of the secret shares to the shareholders, the anonymity service, at block 208, associatively stores the transaction identification and identifications of the shareholders for each secret. That is, the transaction identification is associated with the identifications of the shareholders in possession of secret shares corresponding to that transaction. The transaction identification and shareholder identifications stored by the anonymity service comprise the only information used by the anonymity service to reconstruct secrets corresponding to a given transaction. In this manner, the chances that an adverse party, such as a hacker, discovering an entity's identification, the identification of any providers with whom the entity is dealing with or the identification of any digital products acquired by that entity are substantially minimized.

At block 210, the anonymity service anonymously fulfills the acquisition of the digital product requested by the entity. In this regard, the anonymity service does not disclose the identification of the acquiring entity and the digital product being acquired to any one party. For example, where the entity is acquiring a free software download the anonymity service first reconstructs the identifications of the digital product and a provider of that product by recalling the corresponding secret shares from the appropriate sets of shareholders based on the corresponding transaction identification. The anonymity service thereafter requests the product from the provider without providing the identification of the requesting entity. Upon delivery of the digital product to the anonymity service, the anonymity service thereafter reconstructs the identification of the entity corresponding to that transaction number and provides the digital product to that entity. Where the acquisition by the entity is a purchase of a digital product, the anonymity service again restricts any third party from learning the identification of the entity and the digital product being acquired. This is more fully described with reference to FIGS. 3-6 below.

Once the acquisition of the digital product has been filled by the anonymity service, the only records retained by the anonymity service comprise the transaction identification and the shareholder identifications associated with that transaction identification. If, in the future, a record memorializing the transaction is required (for example, for auditing or legal purposes), an appropriate record can be reconstructed at block 212. To this end, the anonymity service can reconstruct each secret by requesting the secret shares from the corresponding shareholders. In this manner, the present invention provides accountability to prevent fraud and the like while still providing a greater degree of privacy than previously available.

Figure 3:
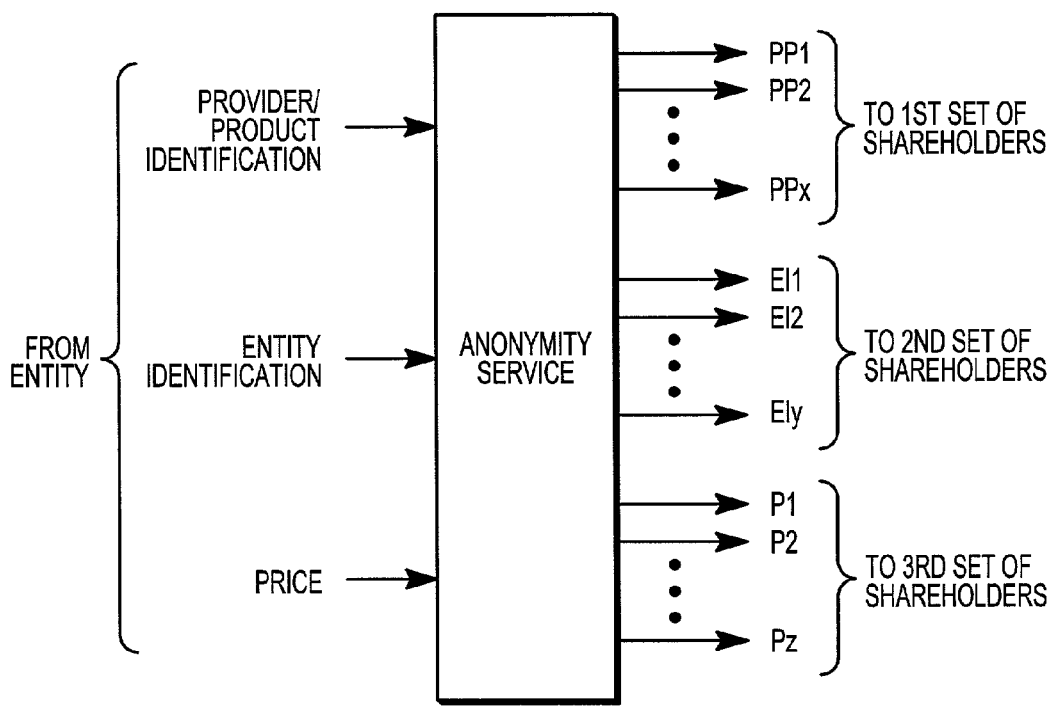
FIGS. 3-6 illustrate operation of an anonymity service in accordance with an embodiment of the present invention.
Figure 4:
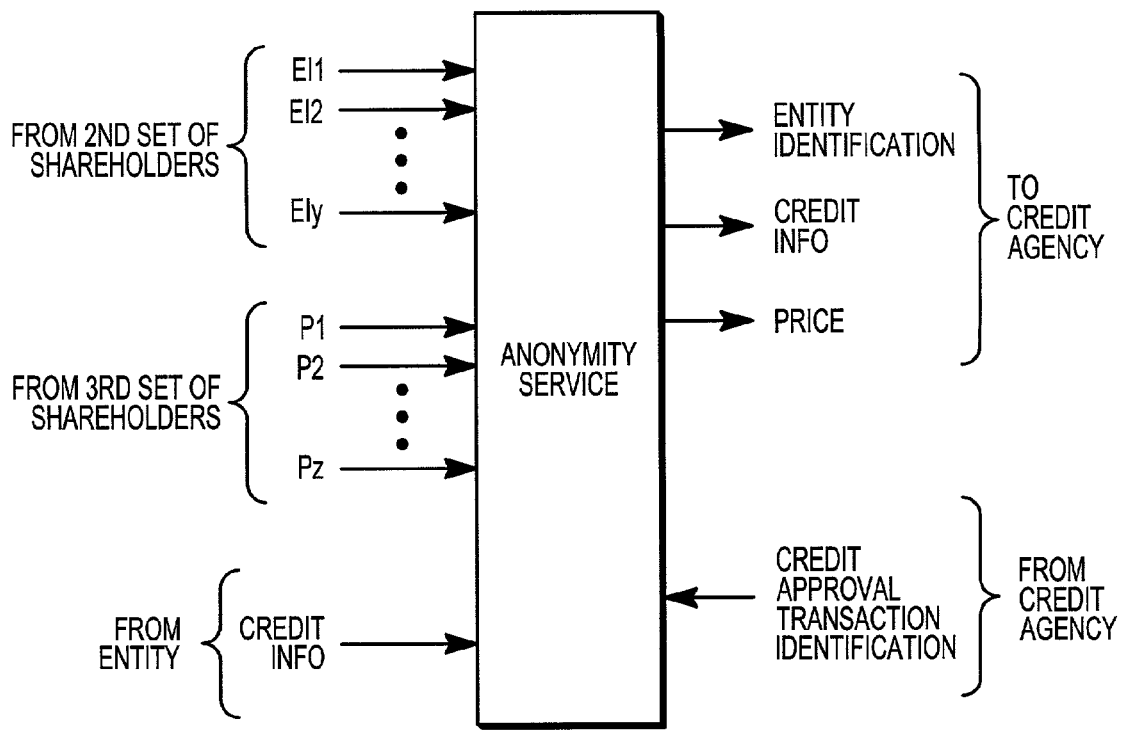

Referring now to FIGS. 3-6, a technique for purchasing a digital product in accordance with the present invention is illustrated. In particular, an entity wishing to purchase a digital product provides at least three pieces of information to the anonymity service: a provider/product identification, an entity identification, and a price as shown in FIG. 3. Note that, for the sake of simplicity, the provider and product identifications are referred to as single piece of information. Where the instant specification refers to one of either the product or provider identification, the other identification is understood to be available or incorporated. In practice, however, these identifications may be treated separately or in a unified fashion. Regardless, using the secret splitting techniques described above, each of these secrets is split into a corresponding plurality of secret shares as shown in FIG. 3. In particular, the provider/product identification is split into a plurality of secret shares labeled PP1-PPx, the entity identification is split into a plurality of secret shares labeled El1-Ely, and the price is split into a plurality of secret shares labeled P1-Pz. Note that the values of x, y, and z do not have to be equal to each other and may take on any values as a matter of design choice. Note also that, although not shown in FIG. 3, each secret share illustrated also includes the transaction identification and, optionally, the identification of the anonymity service provider as previously described, either or both of which may be sent in encrypted form. The identification of the anonymity service allows for the use of multiple anonymity services. Each set of secret shares are sent to a corresponding set of shareholders as shown in FIG. 3. In the example shown, the secret shares corresponding to the provider/product identification are sent to a first set of shareholders, the plurality of secret shares corresponding to the entity identification are sent to a second set of shareholders, and the plurality of secret shares corresponding to the price are sent to a third set of shareholders. Once again, note that the anonymity service does not retain copies of any of the secrets but instead retains the transaction identification and the identifications of the shareholders in each set of shareholders corresponding to that transaction identification.

In order to fulfill the purchase of the digital product, the anonymity service must first verify the available credit of the requesting entity. This is further illustrated in FIG. 4. The anonymity service receives credit information from the entity attempting to purchase the digital product. The credit information preferably comprises a credit card number, bank account number or any other type of information used to verify credit, as well as an identification of the financial institution against which the credit may be checked. The credit information may be transmitted to the anonymity service using known encryption techniques. Additionally, based on the transaction identification, the anonymity service requests the plurality of secret shares corresponding to the entity identification from the second set of shareholders. Likewise, the anonymity service requests the plurality of secret shares corresponding to the purchase price from the third set of shareholders. Based on these secret shares, the anonymity service reconstructs the entity identification and the price, which are thereafter transmitted to the credit agency along with the credit information. Based on this information, using known techniques, the credit agency can verify whether an amount of credit equal to the price is available to the entity identified by the entity identification. Note that the credit agency does not receive an identification of the digital product being purchased by the entity. In this manner, the entity is provided with greater privacy with respect to its purchase decisions.

Assuming that a sufficient amount of credit is available to the purchasing entity, the credit agency responds with a credit approval transaction identification which the anonymity service thereafter associates with the transaction identification. Note that the transaction identification can be sent by the anonymity service to the credit agency such that the credit agency, when responding with the credit approval transaction identification, may also inform the anonymity service which transaction the credit approval refers to. Those having ordinary skill in the art will recognize that other techniques for associating the transaction identification with the credit approval transaction identification may be equally employed.

Figure 5:
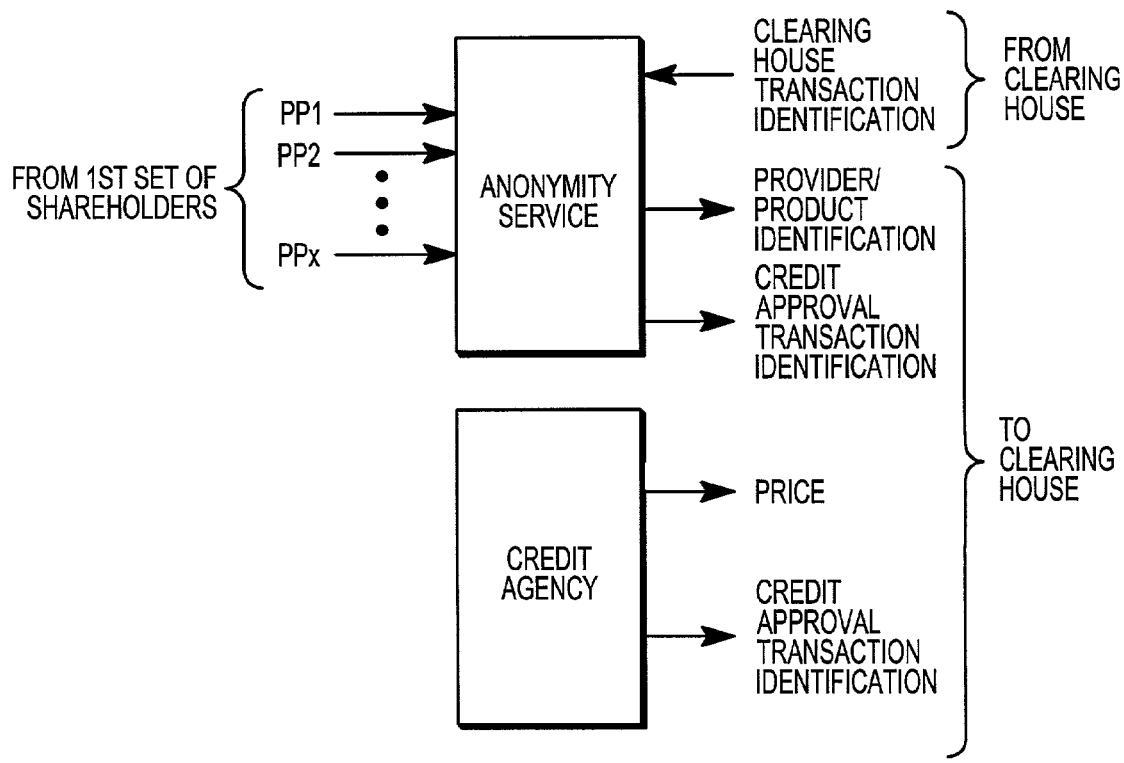
Figure 6:
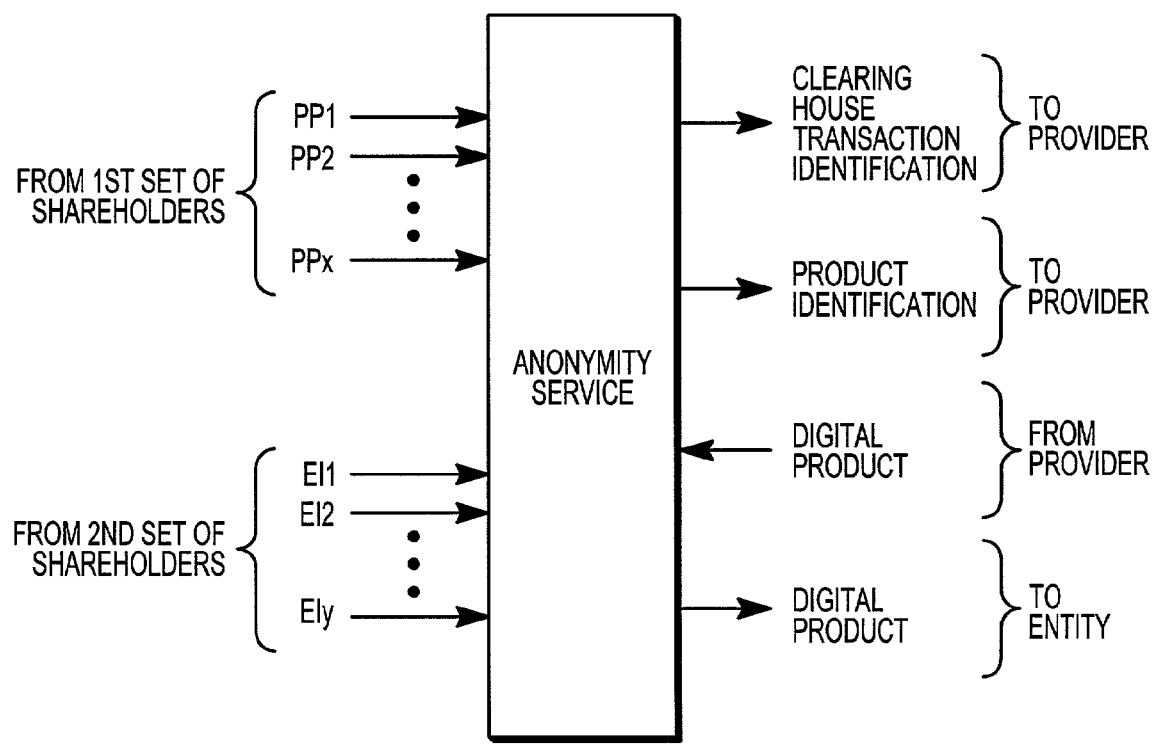

Regardless, once credit approval has been ascertained by the anonymity service, a corresponding amount must be credited to an account of the provider for the purchase of the specific digital product. To this end, the anonymity service and credit agency transmit information to the clearing house as illustrated in FIG. 5. In particular, the anonymity service reconstructs the seller/product identification by recalling the plurality of secret shares from the first set of shareholders. The seller/product identification is thereafter provided to the clearing house along with the credit approval transaction identification. Substantially simultaneously, the credit agency provides the approved amount (the price) and the credit approval transaction identification to the clearing house as well. Alternatively, the clearing house could request the approved amount from the credit agency based on the credit approval transaction identification received from the anonymity service. Seeing the credit approval transaction identification from both the anonymity service and the credit agency, the clearing house thereafter credits an amount equal to the price to an account of the provider for the sale of the product identified in the provider/product identification. In response, the clearing house associates a clearing house transaction identification with this transaction and sends the clearing house transaction identification back to the anonymity service. In this manner, the provider is subsequently able to ascertain the amount of revenue that it has generated based on the sale of its products without necessarily knowing the identification of the entities that are purchasing these products.

Once the account of the provider has been credited with the proper amount, the anonymity service can complete fulfillment of the purchase by requesting the digital product from the provider. This is further illustrated in FIG. 6. In particular, the anonymity service requests the plurality of secret shares from the first set of shareholders to reconstruct the provider/product identification. Based on the provider/product identification, the anonymity service can send a digital product request to the provider identifying the particular product being requested. In response, the provider sends the requested digital product back to the anonymity service. Additionally, the anonymity service sends the clearing house transaction identification to the provider such that the provider, prior to providing the product to the anonymity service, can verify payment with the clearing house. Once the digital product has been delivered to the anonymity service, the anonymity service thereafter requests the plurality of secret shares from the second set of shareholders in order to reconstruct the entity identification. Based on the entity identification the anonymity service is thereafter able to provide the digital product to the entity. In this manner, the anonymity service is able to provide the digital product to the entity without providing the identification of the entity to the provider.

Figure 7:
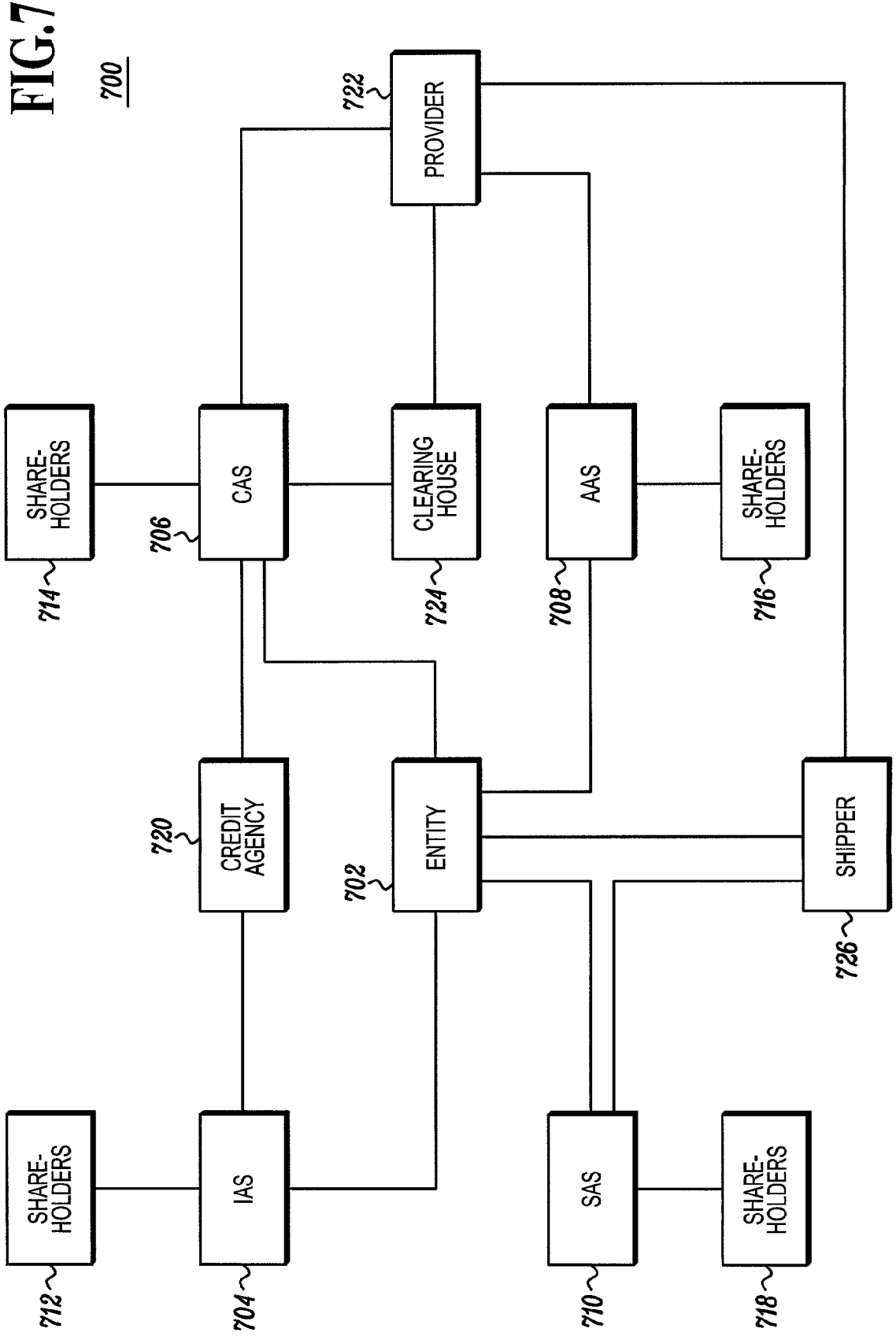
FIGS. 7-12 illustrate operation of a distributed anonymity system in accordance with another embodiment of the present invention.

The anonymity service described above with reference to FIGS. 1-6 illustrates an example in which the anonymity service is embodied as a centralized function. However, a centralized embodiment is not a necessity and a distributed implementation may provide additional security. An example of a distributed anonymity system is further illustrated with reference to FIGS. 7-12. Referring now to FIG. 7, a distributed anonymity system 700 is shown. In particular, the system 700 comprises at least one entity 702 in communication with a plurality of anonymity services 704-710. In the example illustrated in FIG. 7, four function-specific anonymity services are illustrated. Note that a greater or lesser number of function-specific anonymity services could be provided as a matter of design choice; the present invention is not limited in this regard. Preferably, each of the plurality of anonymity services 704-710 are implemented in the same manner as the anonymity service 103 described above. However, the functional operation of each of the plurality of anonymity services may be more limited relative to the operation of the anonymity service 103 previously described. An identification anonymity service (IAS) 704 operates upon entity identification information provided by the entity 702. A credit anonymity service (CAS) 706 operates on credit information provided by the entity 702. An acquisition anonymity service (MS) 708 operates upon an acquisition request provided by the entity 702 used to acquire goods from a provider. Finally, a shipping anonymity service (SAS) 710 operates upon shipping information provided by the entity 702. Once again, the functional distribution of the anonymity services shown in FIG. 7 is not a requirement. Indeed, the specific responsibility of each anonymity service will typically be driven by the different types of secrets to be protected.

Each of the anonymity services 704-710 operate upon transactionrelated information (e.g., an acquisition request, a shipment address or a credit approval request, as described in further detail below) provided by the entity 702 in accordance with the previously-described secret splitting techniques. To this end, each anonymity service 704-710 has associated therewith a corresponding set of shareholders 712-718. Each set of shareholders 712-718 may be uniquely associated with its corresponding anonymity service 704-710, or shareholders may be shared amongst the various anonymity services as a matter of design choice. Regardless, the system 700 additionally comprises a credit agency 720, provider 722, and a shipper 726. The credit agency 720 and provider 722 are essentially equivalent to those functions previously described. The shipper 726 comprises any publicly available delivery service or the like. As described in greater detail below, the system 700 may be used to anonymously provide goods to the entity 702.

Figure 8:
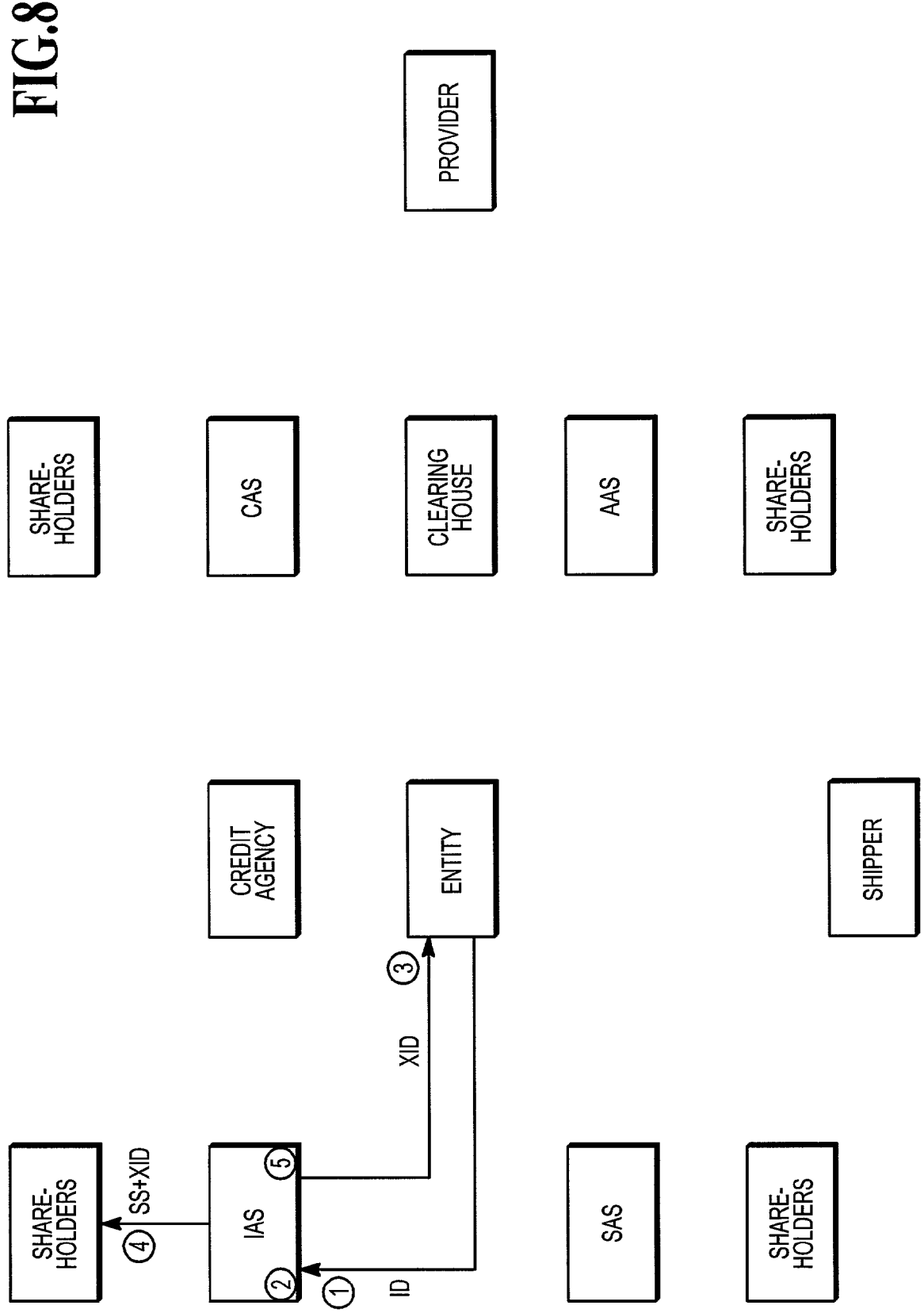

Referring now to FIG. 8, interactions between the entity and the identification anonymity service are described in greater detail. Note that in FIG. 8, as well as FIGS. 9-12, various steps are numerically identified. However, it is understood that the numerical progression of the steps illustrated in FIGS. 8-12 does not necessarily limit performance of the illustrated steps to the sequence indicated. Regardless, when the entity desires to obtain goods from the provider, the process begins at step 1 by the entity transmitting an entity identification (ID) to the identification anonymity service. Note that, in this embodiment the requested goods may comprise digital products as previously described, or may comprise tangible or physical products that may be delivered in a conventional manner. By transmitting its entity identification (ID) to the identification anonymity service, the entity manifests its intent to engage in a transaction with a provider. Therefore, in response at step 2, the identification anonymity service generates a transaction identification (XID) which it thereafter sends back to the entity at step 3. Note that this is in contrast to the previously described embodiments in which the transaction identification (XID) was maintained only by the anonymity service. As identified by step 4, the identification anonymity service splits the entity identification (ID) into a plurality of secret shares (SS) and provides the secret shares (SS) and the transaction identification (XID) to its corresponding shareholders, using the previously described techniques. Because the transaction identification (XID) by itself cannot serve to identify the entity, the entity's identification is preserved in confidence but is nevertheless retrievable as needed. Finally, after having split the entity identification (ID) into the secret shares (SS), the identification anonymity service discards the entity identification (ID) as well as the transaction identification (XID) at step 5. Once again, note that this differs from previously described embodiments in that the entity maintains the transaction identification (XID) as opposed to the identification anonymity service.

Figure 9:
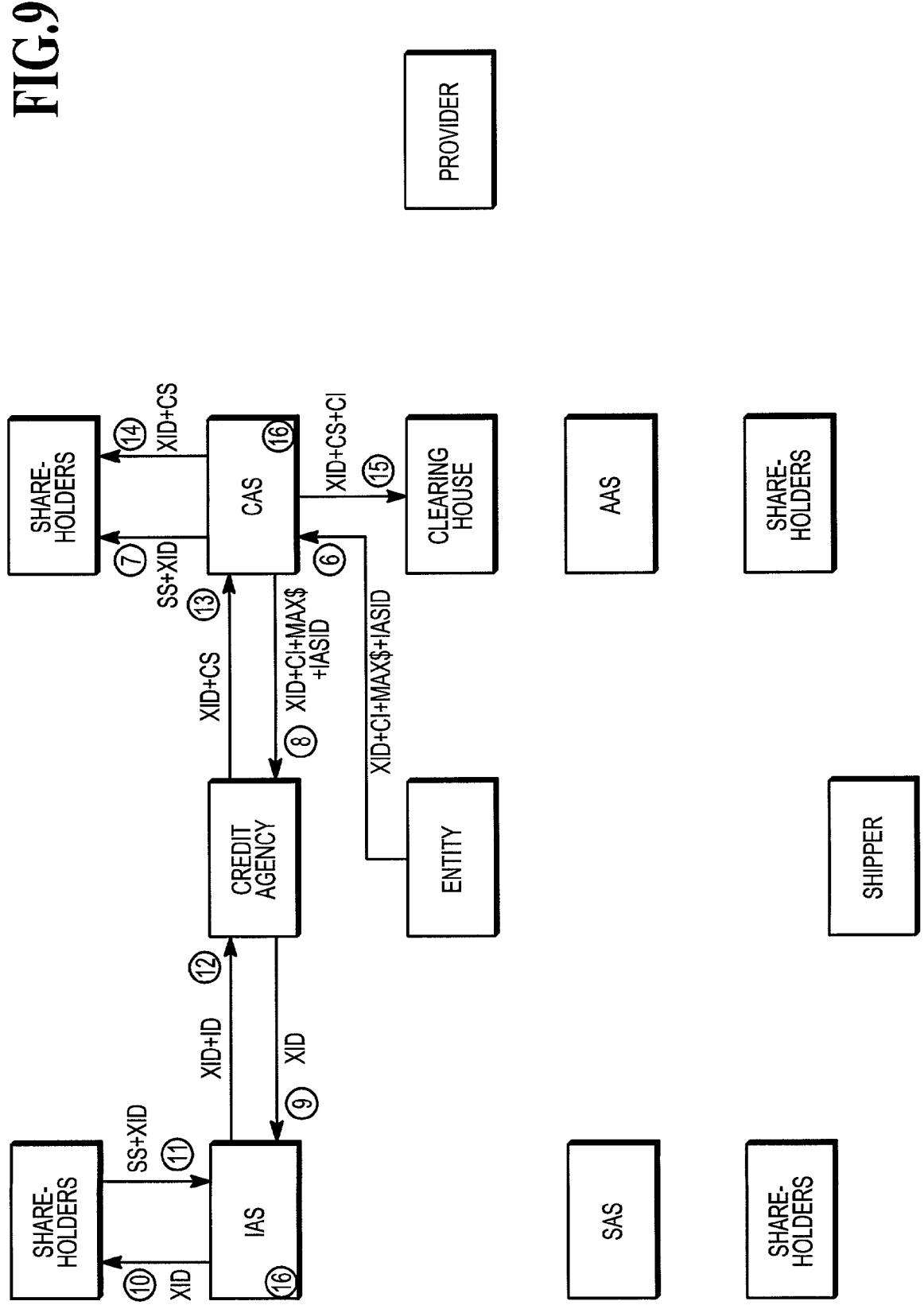

Continuing with reference to FIG. 9, the entity can initiate credit approval by sending a credit approval request to the credit anonymity service at step 6. As shown, the credit approval request comprises, in addition to the transaction identification (XID), the entity's credit information (CI), a maximum payment amount (MAX$) and an identification of the relevant identification anonymity service (IASID). The maximum payment amount (MAX$) is provided as a means for accommodating the fact that the credit agency will be asked to approve credit of a lump sum, which may or may not include one or more items. This limit allows the credit agency to make the approval for no more than a specified amount (in case the price of any of the goods has gone up) and allows payment to be made on behalf of the purchaser without the credit agency knowing what is and is not being purchased. Likewise, some of the physical goods may not be available, in which case the total price will be less. If the amount provided by the entity is exactly equal to the expected purchase price, the odds of the transaction failing is greater. Additionally, the purchaser may not know the exact amount of shipping costs in advance. Given these uncertainties, the maximum payment amount (MAX$) allows the entity to specify more credit than may be necessary to actually fulfill the transaction, with the expectation that a lesser amount will be used as needed. The credit information (CI), as defined above, allows a credit agency to determine the availability of credit on behalf of the requesting entity.

In response to the credit approval request, the credit anonymity service splits the information constituting the credit approval request into secret shares (SS) which it subsequently sends to its corresponding shareholders along with the transaction identification (XID) at step 7. The credit anonymity service sends the credit approval request directly to the credit agency at step 8. Based on the identification of the identification anonymity service (IASID), the credit agency sends, at step 9, the transaction identification (XID) to the identification anonymity service (IASID), which in turn retrieves the relevant secret shares (SS) from its shareholders based on the transaction identification (XID) at steps 10 and 11. The identification anonymity service thereafter reconstructs the entity identification (ID) associated with the transaction and sends the entity identification (ID) back to the credit agency along with the transaction identification (XID) at step 12. With the entity identification (ID) in hand, the credit agency can verify the availability of the maximum payment amount (MAX$) for the requesting entity based on the credit information (CI). Based on this determination, the credit agency thereafter sends a credit status indication (CS) indicative of the availability of sufficient credit (or lack thereof) and the transaction identification (XID) to the credit anonymity service at step 13. The credit status indication (CS) may be a binary flag indicating whether the maximum payment amount (MAX$) is available or not.

Note that the credit agency only receives information that allows it to determine whether a maximum payment amount (MAX$) may be covered by a given entity's credit provider. At no time is the credit agency provided with an identification of the goods associated with the particular transaction. Upon receiving the credit status indication (CS), the credit anonymity service sends the credit status indication (CS) and transaction identification (XID) to the shareholders for storage at step 14. Note that the credit anonymity service does not apply secret splitting techniques to the credit status indication (CS) where the credit status indication (CS) comprises a single bit binary flag. Because the transaction identification (XID) is sent with all information provided by the credit anonymity service to its corresponding shareholders, the shareholders are able to associate the secret shares (SS) and credit status information with the transaction identification (XID) for later recall. At substantially the same time, the credit anonymity service additionally sends the transaction identification (XID), credit status indication (CS) and the credit information (CI) to the clearing house at step 15. Finally, as indicated by step 16, the credit anonymity service and the identification anonymity service conclude their processing at this point by discarding all information associated with the entity identification (ID), the credit approval request as well as the credit status indication (CS) previously provided.

Figure 10:
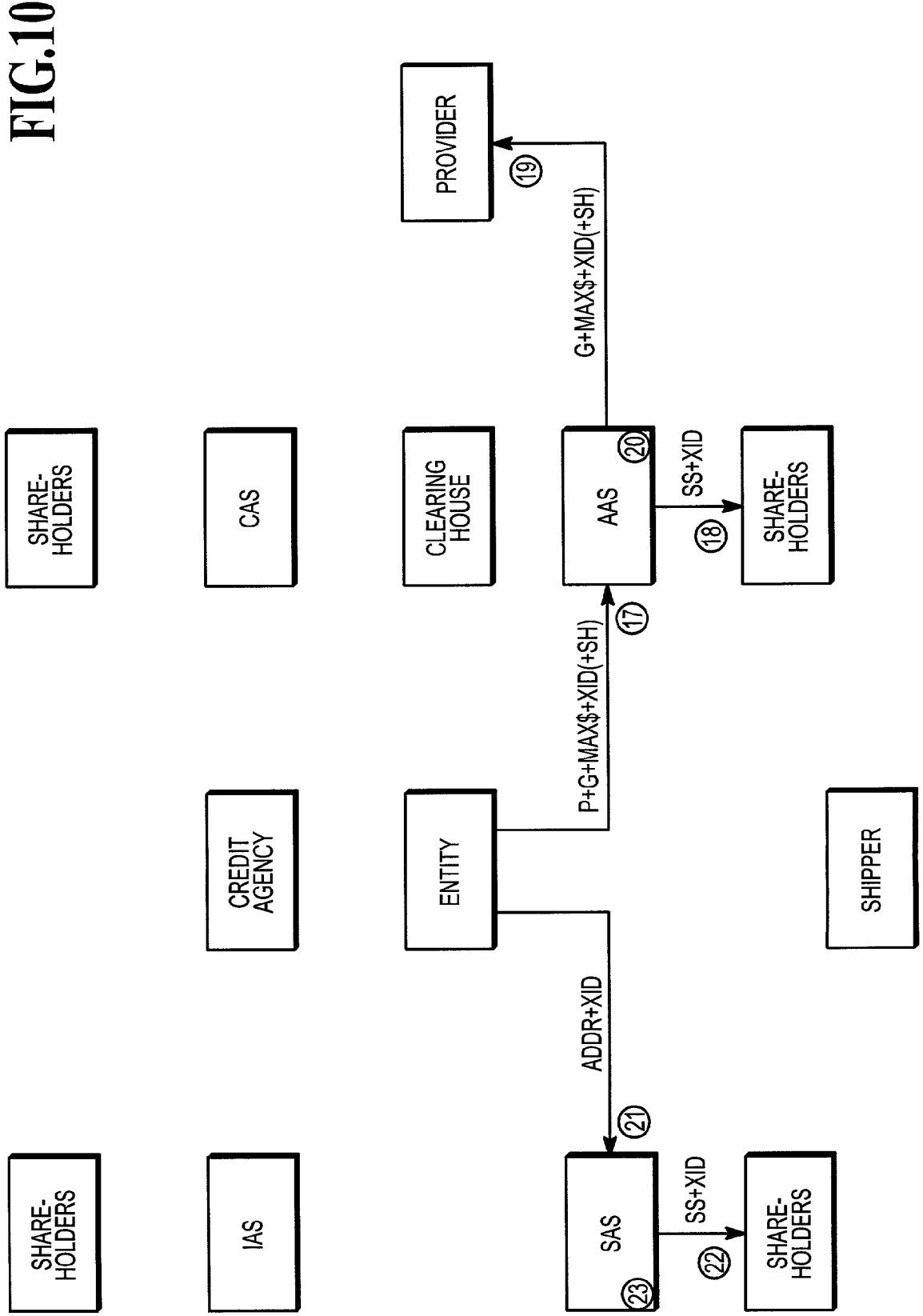

Referring now to FIG. 10, the actual acquisition of the desired goods is initiated when the entity sends an acquisition request to the acquisition anonymity service at step 17. The acquisition request may comprise, in addition to the transaction identification (XID), an identification of the targeted provider (P), an identification of the goods (G), the maximum payment amount (MAX$) and an identification of a desired shipper (SH). The identification of the provider (P) may further comprise information sufficient to allow the acquisition anonymity service to identify the correct provider to which the acquisition request is forwarded. The identification of the desired shipper (SH) allows the provider to identify and communicate with the entity's desired shipping service. Note that a shipper is used in those instances where it is desired to prevent the provider from knowing the shipping address of the entity and, by possible implication, the identity of the entity. The identification of goods (G) comprises any information sufficient to allow the provider to identify the desired goods in sufficient detail so as to complete the transaction.

Based on the acquisition request, at step 18, the acquisition anonymity service performs secret splitting operations upon the information included in the acquisition request (with the exception of the transaction identification (XID) and provides the resulting secret shares (SS) and transaction identification (XID) to its corresponding shareholders. Also, at step 19, the acquisition anonymity service, based on the identification of the provider (P) included in the acquisition request, provides the identification of the goods (G), the authorized payment amount, the transaction identification (XID) and, optionally, the identification of the shipper (SH) to the provider for fulfillment of the transaction, as further illustrated in FIGS. 11 and 12. Finally, the acquisition anonymity service, at step 20, discards all of the information associated with the acquisition request.

Although not shown in FIG. 10, the acquisition request also may comprise, or may be sent along with, information identifying a particular credit anonymity service and/or clearing house that the provider is to use when securing payment, if necessary. By allowing the entity to specify which credit anonymity service and/or clearing house to use, as presently preferred, security is generally enhanced to the extent that it would be very difficult for the provider to collaborate with the credit anonymity service and clearing house to ascertain the entity's identity.

In addition to sending the acquisition request to the acquisition anonymity service, the entity also sends a shipment address (ADDR) and the transaction identification (XID) to a shipping anonymity service at step 21. Using the secret splitting techniques previously described, at step 22, the shipping anonymity service splits the shipment address (ADDR) into a plurality of secret shares (SS) which are subsequently provided along with the transaction identification (XID) to the plurality of shareholders associated with the shipping anonymity service. Once again, the shipping anonymity service thereafter discards the shipment address (ADDR), at step 23, thereby enhancing security. Note, at this point, the provider only has knowledge of the goods associated with a transaction identification (XID), as well as how to contact the shipping anonymity service and the clearing house, and does not have any knowledge of the particular entity seeking to acquire the goods.

Figure 11:
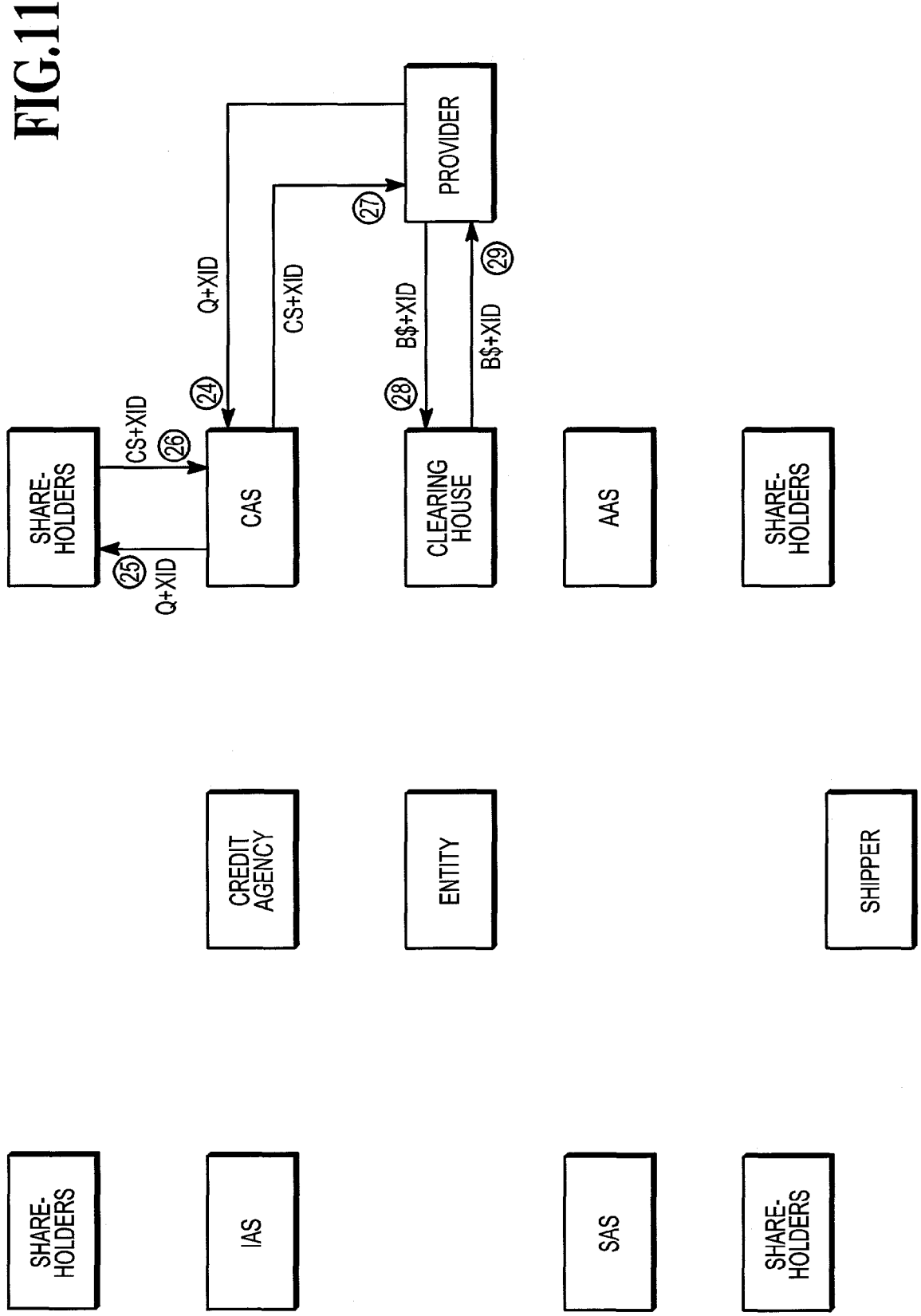

Referring now to FIG. 11, the provider attempts to obtain payment for the requested goods by first sending a credit status query (Q) along with the transaction identification (XID) previously received from the acquisition anonymity service, to the credit anonymity service at step 24. In response to the credit status query (Q), the credit anonymity service sends the credit status query (Q) and the transaction identification (XID) to the shareholders, thereby obtaining the credit status indication (CS) (steps 26 and 26). Recall that the credit status indication (CS) designates whether a maximum payment amount (MAX$) has been approved. Regardless, the credit anonymity service thereafter provides the credit status indicator, along with the transaction identification (XID), to the provider at step 27.

If the credit status indicator indicates that at least the necessary amount has been approved by the credit agency, the provider fulfills the requested transaction and calculates a billed amount (B$), which is subsequently sent to the clearing house along with the transaction identification (XID) at step 28. Recall that the clearing house previously received the transaction identification (XID) along with the credit status indication (CS). As a result, the clearing house knows that it is proper to pay the provider the billed amount (B$) and accordingly debit an account associated with the transaction identification (XID). To this end, the clearing house causes the entity's credit account, as determined by the previously received credit information (CI) associated with the transaction identification (XID) (see FIG. 9), to be debited by the billed amount (B$). At the same time, the clearing house pays the provider based on the transaction identification (XID) as indicated by step 29. In a preferred embodiment, payment to the provider is handled by crediting a bank account or the like of the provider. Once again, note that neither the clearing house nor the provider is aware of the particular entity acquiring the goods, and the clearing house is not aware of the goods being acquired.

Figure 12:
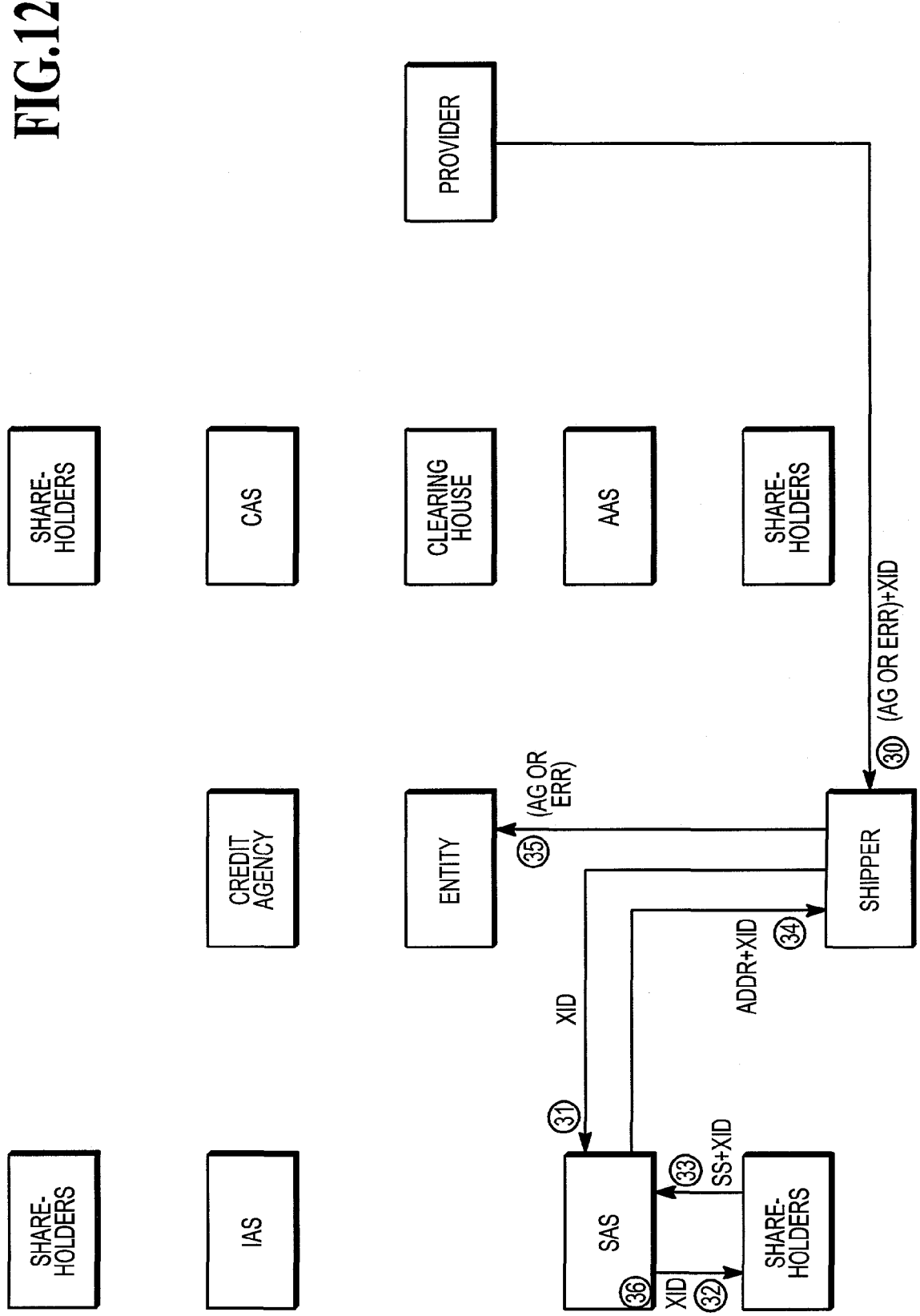

Regardless of whether the credit status indicator indicates that the transaction has been approved by the credit agency (i.e., that a sufficient amount of credit was available), processing continues as illustrated in FIG. 12. In particular, if the credit status indicator indicates that an insufficient amount of credit is available (i.e., that the transaction is not approved), the provider will send an error message (ERR) so indicating, along with the transaction identification (XID), to the shipper at step 30. The error message (ERR) and transaction identification (XID) may be provided electronically in the form of a digital message. Alternatively, if the credit status indicator indicates that the transaction has been approved, the provider sends the goods in an anonymous fashion (AG) along with the transaction identification (XID) to the shipper at step 30. In the case of digital products, encryption techniques may be used to prevent identification of the goods. Likewise, in the case of tangible goods, the proverbial "plain brown wrapper" or similar techniques may be used to prevent identification of the goods. In response, the shipper sends the transaction identification (XID) to the shipping anonymity service at step 31. Based on the transaction identification (XID), the shipping anonymity service obtains the secret shares (SS) corresponding to the transaction identification (XID) from its shareholders at steps 32 and 33. The shipping anonymity service thereafter reconstructs the shipment address (ADDR) from the secret shares (SS) and subsequently sends the shipment address (ADDR) along with the transaction identification (XID) back to the shipper at step 34. Based on this information, the shipper is able to deliver the anonymous goods (AG) or error message (ERR) to the entity at step 35. Once again, note that the shipper, assuming that the goods have been anonymously provided to the shipper, is not aware of what it is delivering to the entity nor is the shipper aware of what the entity paid, if anything, for the goods. Finally, at step 36, the shipping anonymity service discards the reconstructed shipping address to preserve anonymity.

Therefore, using the distributed system illustrated in FIGS. 7-12, the present invention provides an even greater degree of anonymity to entities seeking to acquire goods in that completely anonymous services are used to process the various components of the transaction. Because such sensitive components are stored as secrets using secret splitting techniques, only a transaction identification is needed to reconstruct the relevant information, which transaction identification does not itself reveal any secrets associated with the transaction.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. For example, secure multi-party computing could be used in place of an anonymity service. That is, rather than single third parties managing anonymous transactions, a distributed model may be employed. As known in the art, secure multi-party computation involves passing a digital object (e.g., a piece of data) from one shareholder to the next. Throughout this chain, each shareholder performs an operation such that, by the time the last shareholder has completed its operation, a desired function has been achieved as a cumulative effect of the processing performed by each of the shareholders. For example, secret shares of public keys may be used in this manner to encrypt and decrypt data. As a result, the provider could send the product to the acquiring entity in an encrypted form by letting the shareholders encrypt the product using secure multi-party computation. Thus, in the context of the present invention, the shareholders themselves may implement the product delivery or other functions of the secret share (if the shareholders are known to each other) using known techniques.

Furthermore, the present invention has been described in terms of single transactions. However, it need not be so limited and could be expanded to handle multiple transactions. For example, where an entity seeks to purchase multiple electronic books from an on-line provider in a single transaction, the acquiring entity could split the multiple products (the electronic books) into separate transactions as described above. The splitting of a single transaction comprising multiple items into multiple transactions each comprising a single item also offers a solution to those instances in which one of the items is not available. Without splitting such a single transaction/multiple item request into separate transactions, the unavailability of one of the items would result in the acquiring entity having been approved for more than necessary. In this case, an amount less than or equal to that which was approved may be paid to the product provider, with any overage credited back by the provider to the transaction identification and, in turn, to an account of the acquiring entity. Alternatively, where such a single transaction/multiple item request is split into separate transactions, this process can be performed on each item separately.

In yet another embodiment, the anonymity services, rather than immediately splitting the secrets up, sending them to the shareholders and then recalling them thereafter for reconstruction, could immediately use the first required secret prior to splitting. For example, when an entity makes a purchase, rather than first splitting the entity's identity and subsequently reconstructing it when needed, the identity anonymity service could immediately send the entity's identity to the credit agency and thereafter split the entity's identity as needed. Similarly, where a non-purchase transaction occurs, the acquisition anonymity service could immediately provide the product identification to the provider and thereafter split the product identification. In either case, the anonymity services again do not retain the secrets after they have been split. In this manner, a degree of added efficiency is provided without a significant sacrifice in security.

As described above, the anonymity services split the transaction-related information into a plurality of secret shares, which secret shares are thereafter distributed to a corresponding set of shareholders. However, in practice, the composition of each set of shareholders may be modified as a matter of design choice. For example, each set of shareholders may be completely separate from and independent of the other sets of shareholders. At the other extreme, a single set of shareholders may be used by all of the anonymity services. Of course, an intermediate approach may be used in which a given anonymity service's set of shareholders comprises shareholders that are separate from and independent of all other shareholders and shareholders that are common to the other sets of shareholders.

Additionally, although a specific distributed system example has been illustrated in FIGS. 7-12, alternative embodiments are possible. For example, where the transaction is not a purchase of goods, but rather an acquisition of a sample or freeware, all the processing previously described relating to the determination and settlement of credit information may be eliminated, i.e., all steps illustrated in FIGS. 9 and 11.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for an entity desiring goods to anonymously engage in a transaction with a provider providing the goods, the method comprising:
    initiating the transaction by sending, from the entity, an entity identification of the entity to a first anonymity service, the first anonymity service comprising a computer processor for processing the transaction, and being distinct from the entity and the provider;
    receiving, at the entity from the first anonymity service, a transaction identification based on and uniquely associated with the entity identification;
    initiating acquisition of goods associated with the transaction by sending, from the entity, an acquisition request of the entity and the transaction identification to a second anonymity service, the second anonymity service comprising a computer processor for processing the acquisition request, and being distinct from the entity, the provider, and the first anonymity service, wherein the acquisition request includes an identification of the goods to be provided by the provider;
    splitting, by the first anonymity service, the entity identification of the entity into a first plurality of secret shares, and splitting, by the second anonymity service, the acquisition request of the entity into a second plurality of secret shares;
    after splitting the entity identification, discarding, by the first anonymity service, the entity identification of the entity, and after splitting the acquisition request, discarding, by the second anonymity service, the acquisition request of the entity;
    after discarding the entity identification, receiving, at the first anonymity service, the transaction identification, obtaining, by the first anonymity service, the first plurality of secret shares corresponding to the transaction identification, and reconstructing, by the first anonymity service, the entity identification of the entity from the first plurality of secret shares.

2. The method of claim 1, wherein the first and second anonymity services cause the goods associated with the transaction to be anonymously provided to the entity.

3. The method of claim 1, further comprising:
    sending, by the first anonymity service, the transaction identification and individual ones of the first plurality of secret shares corresponding to the entity identification to corresponding ones of a first set of shareholders, and
    sending, by the second anonymity service, the transaction identification and individual ones of the second plurality of secret shares corresponding to the acquisition request to corresponding ones of a second set of shareholders.

4. The method of claim 3, wherein at least some of the second set of shareholders are different from at least some others of the first set of shareholders.

5. The method of claim 3, wherein the second set of shareholders is identical to the first set of shareholders.

6. The method of claim 1, further comprising:
    initiating shipment of the goods associated with the transaction by sending, from the entity, a shipment address and the transaction identification to a third anonymity service, the third anonymity service being distinct from the entity, the provider, and the first and second anonymity services,
    wherein the first, second and third anonymity services cause the goods associated with the transaction to be anonymously provided to the entity.

7. The method of claim 6, further comprising:
    initiating credit approval for the transaction by sending, from the entity, a credit approval request and the transaction identification to a fourth anonymity service, the fourth anonymity service being distinct from the entity, the provider, and the first, second and third anonymity services,
    wherein the first, second, third and fourth anonymity services cause the goods associated with the transaction to be anonymously provided to the entity.

8. The method of claim 1, wherein the first anonymity service comprises an identification anonymity service, and the second anonymity service comprises an acquisition anonymity service.

9. The method of claim 6, wherein the first anonymity service comprises an identification anonymity service, the second anonymity service comprises an acquisition anonymity service, and the third anonymity service comprises a shipping anonymity service.

10. The method of claim 7, wherein the first anonymity service comprises an identification anonymity service, the second anonymity service comprises an acquisition anonymity service, the third anonymity service comprises a shipping anonymity service, and the fourth anonymity service comprises a credit anonymity service.

11. A computer-readable medium comprising computer-readable instructions for performing steps of a method for an entity desiring goods to anonymously engage in a transaction with a provider providing the goods comprising:
    initiating the transaction by sending, from the entity, an entity identification of the entity to a first anonymity service, the first anonymity service being distinct from the entity and the provider;
    receiving, at the entity from the first anonymity service, a transaction identification based on and uniquely associated with the entity identification;
    initiating acquisition of goods associated with the transaction by sending, from the entity, an acquisition request of the entity and the transaction identification to a second anonymity service, the second anonymity service being distinct from the entity, the provider, and the first anonymity service, wherein the acquisition request includes an identification of the goods to be provided by the provider;
    splitting, by the first anonymity service, the entity identification into a first plurality of secret shares, and splitting, by the second anonymity service, the acquisition request into a second plurality of secret shares;
    after splitting the entity identification, discarding, by the first anonymity service, the entity identification, and after splitting the acquisition request, discarding, by the second anonymity service, the acquisition request;

after discarding the entity identification, receiving, at the first anonymity service, the transaction identification, obtaining, by the first anonymity service, the first plurality of secret shares corresponding to the transaction identification, and reconstructing, by the first anonymity service, the entity identification from the first plurality of secret shares.

12. The computer-readable medium of claim 11 further comprising computer-readable instructions for performing steps of:

initiating shipment of the goods associated with the transaction by sending, from the entity, a shipment address and the transaction identification to a third anonymity service, the third anonymity service being distinct from the entity, the provider, and the first and second anonymity services.

13. The computer-readable medium of claim 12 further comprising computer-readable instructions for performing steps of:

initiating credit approval for the transaction by sending, from the entity, a credit approval request and the transaction identification to a fourth anonymity service, the fourth anonymity service being distinct from the entity, the provider, and the first, second and third anonymity services.

14. A method for a shipper to support an anonymous transaction between an entity desiring goods and a provider providing the goods using at least one anonymity service, the at least one anonymity service including a computer processor for processing the anonymous transaction, and being distinct from the entity, the provider, and the shipper, the method comprising:

receiving, at the shipper from the provider, anonymous goods and a transaction identification of the transaction;

sending, from the shipper to the at least one anonymity service, the transaction identification;

receiving, at the shipper from the at least one anonymity service, a shipping address of the entity and the transaction identification; and shipping, from the shipper, the anonymous goods to the entity based on the shipping address, and further comprising before sending the transaction identification, receiving, at the at least one anonymity service from the entity, the shipping address and the transaction identification;

splitting, by the at least one anonymity service, the shipping address into a plurality of secret shares, and providing the transaction identification and different ones of the plurality of secret shares to a plurality of shareholders;

after splitting the shipping address, discarding, by the at least one anonymity service, the shipping address;

after discarding the shipping address and after sending the transaction identification, obtaining, by the at least one anonymity service, the plurality of secret shares corresponding to the transaction identification from the plurality of shareholders; and reconstructing, by the at least one anonymity service, the shipping address from the plurality of secret shares.

15. The method of claim 14, wherein the at least one anonymity service comprises a shipping anonymity service.

16. A system for providing an anonymous transaction between an entity desiring goods and a provider providing the goods, the system comprising:

a first anonymity service that receives an entity identification of the entity from the entity and, in response, provides a transaction identification, based on and uniquely associated with the entity identification, to the entity, wherein the first anonymity service includes a computer processor for executing the anonymous transaction, and is distinct from the entity and the provider; and a second anonymity service, coupled to the entity and the provider, that receives the transaction identification and an acquisition request of the entity from the entity and, in response, provides at least a portion of the acquisition request to the provider, wherein the second anonymity service includes a computer processor for executing the acquisition request, and is distinct from the entity, the provider, and the first anonymity service, and wherein the acquisition request includes an identification of the goods to be provided by the provider, wherein the first anonymity service splits the entity identification of the entity into a first plurality of secret shares, and wherein the second anonymity service splits the acquisition request of the entity into a second plurality of secret shares, wherein after the first anonymity service splits the entity identification, the first anonymity service discards the entity identification of the entity, and wherein after the second anonymity service splits the acquisition request, the second anonymity service discards the acquisition request of the entity, wherein after the first anonymity service discards the entity identification, the first anonymity service receives the transaction identification, obtains the first plurality of secret shares corresponding to the transaction identification, and reconstructs the entity identification of the entity from the first plurality of secret shares.

17. The system of claim 16, further comprising at least one set of shareholders coupled to the first anonymity service and the second anonymity service, wherein the first anonymity service sends the transaction identification and individual ones of the first plurality of secret shares corresponding to the entity identification to corresponding ones of a first set of shareholders of the at least one set of shareholders, and wherein the second anonymity service sends the transaction identification and individual ones of the second plurality of secret shares corresponding to the acquisition request to corresponding ones of a second set of shareholders of the at least one set of shareholders.

18. The system of claim 17, wherein at least some of the second set of shareholders are different from at least some others of the first set of shareholders.

19. The system of claim 17, wherein the second set of shareholders is identical to the first set of shareholders.

20. The system of claim 16, further comprising:

a third anonymity service that receives the transaction identification and a shipment address from the entity and, in response to receiving the transaction identification from a shipper, provides the shipment address to the shipper, wherein the third anonymity service is distinct from the entity, the provider, and the first and second anonymity services.

21. The system of claim 20, further comprising:

a fourth anonymity service that receives the transaction identification and a credit approval request from the entity and, in response to receiving the transaction identification and a credit status query from the provider, provides a credit status indication to the provider, wherein the fourth anonymity service is distinct from the entity, the provider, and the first, second and third anonymity services.

22. The system of claim 16, wherein the first anonymity service comprises an identification anonymity service, and the second anonymity service comprises an acquisition anonymity service.

23. The system of claim 20, wherein the first anonymity service comprises an identification anonymity service, the second anonymity service comprises an acquisition anonymity service, and the third anonymity service comprises a shipping anonymity service.

24. The system of claim 21, wherein the first anonymity service comprises an identification anonymity service, the second anonymity service comprises an acquisition anonymity service, the third anonymity service comprises a shipping anonymity service, and the fourth anonymity service comprises a credit anonymity service.

25. A method for an entity desiring goods to anonymously engage in a transaction with a provider providing the goods, the method comprising:
 initiating the transaction, including receiving, at a first anonymity service from the entity, an entity identification of the entity, the first anonymity service comprising a computer processor for processing the transaction, and being distinct from the entity and the provider;
 sending, to the entity from the first anonymity service, a transaction identification based on and uniquely associated with the entity identification;
 initiating acquisition of goods associated with the transaction, including receiving, at a second anonymity service from the entity, an acquisition request of the entity and the transaction identification, the second anonymity service comprising a computer processor for processing the acquisition request, and being distinct from the entity, the provider, and the first anonymity service, wherein the acquisition request includes an identification of the goods to be provided by the provider;
 splitting, by the first anonymity service, the entity identification into a first plurality of secret shares, and splitting, by the second anonymity service, the acquisition request into a second plurality of secret shares;
 after splitting the entity identification, discarding, by the first anonymity service, the entity identification, and after splitting the acquisition request, discarding, by the second anonymity service, the acquisition request;
 after discarding the entity identification, receiving, at the first anonymity service, the transaction identification, obtaining, by the first anonymity service, the first plurality of secret shares corresponding to the transaction identification, and reconstructing, by the first anonymity service, the entity identification from the first plurality of secret shares.

26. The method of claim 25, wherein the first and second anonymity services cause the goods associated with the transaction to be anonymously provided to the entity.

27. The method of claim 25, further comprising:
 sending, by the first anonymity service, the transaction identification and individual ones of the first plurality of secret shares corresponding to the entity identification to corresponding ones of a first set of shareholders, and
 sending, by the second anonymity service, the transaction identification and individual ones of the second plurality of secret shares corresponding to the acquisition request to corresponding ones of a second set of shareholders.

28. The method of claim 27, wherein at least some of the second set of shareholders are different from at least some others of the first set of shareholders.

29. The method of claim 27, wherein the second set of shareholders is identical to the first set of shareholders.

30. The method of claim 25, further comprising:
 initiating shipment of the goods associated with the transaction, including receiving, at a third anonymity service from the entity, a shipment address and the transaction identification, the third anonymity service being distinct from the entity, the provider, and the first and second anonymity services,
 wherein the first, second and third anonymity services cause the goods associated with the transaction to be anonymously provided to the entity.

31. The method of claim 30, further comprising:
 initiating credit approval for the transaction, including receiving, at a fourth anonymity service from the entity, a credit approval request and the transaction identification, the fourth anonymity service being distinct from the entity, the provider, and the first, second and third anonymity services,
 wherein the first, second, third and fourth anonymity services cause the goods associated with the transaction to be anonymously provided to the entity.

32. The method of claim 25, wherein the first anonymity service comprises an identification anonymity service, and the second anonymity service comprises an acquisition anonymity service.

33. The method of claim 30, wherein the first anonymity service comprises an identification anonymity service, the second anonymity service comprises an acquisition anonymity service, and the third anonymity service comprises a shipping anonymity service.

34. The method of claim 31, wherein the first anonymity service comprises an identification anonymity service, the second anonymity service comprises an acquisition anonymity service, the third anonymity service comprises a shipping anonymity service, and the fourth anonymity service comprises a credit anonymity service.

35. A computer-readable medium comprising computer-readable instructions for performing steps of a method for an entity desiring goods to anonymously engage in a transaction with a provider providing the goods comprising:
 initiating the transaction, including receiving, at a first anonymity service from the entity, an entity identification of the entity, the first anonymity service being distinct from the entity and the provider;
 sending, to the entity from the first anonymity service, a transaction identification based on and uniquely associated with the entity identification;
 initiating acquisition of goods associated with the transaction, including receiving, at a second anonymity service from the entity, an acquisition request of the entity and the transaction identification, the second anonymity service being distinct from the entity, the provider, and the first anonymity service, wherein the acquisition request includes an identification of the goods to be provided by the provider;
 splitting, by the first anonymity service, the entity identification into a first plurality of secret shares, and splitting, by the second anonymity service, the acquisition request into a second plurality of secret shares;
 after splitting the entity identification, discarding, by the first anonymity service, the entity identification, and after splitting the acquisition request, discarding, by the second anonymity service, the acquisition request;

after discarding the entity identification, receiving, at the first anonymity service, the transaction identification, obtaining, by the first anonymity service, the first plurality of secret shares corresponding to the transaction identification, and reconstructing, by the first anonymity service, the entity identification from the first plurality of secret shares.

36. The computer-readable medium of claim 35 further comprising computer-readable instructions for performing steps of:

initiating shipment of the goods associated with the transaction, including receiving, at a third anonymity service from the entity, a shipment address and the transaction identification, the third anonymity service being distinct from the entity, the provider, and the first and second anonymity services.

37. The computer-readable medium of claim 36 further comprising computer-readable instructions for performing steps of:

initiating credit approval for the transaction, including receiving, at a fourth anonymity service from the entity, a credit approval request and the transaction identification, the fourth anonymity service being distinct from the entity, the provider, and the first, second and third anonymity services.

* * * * *